United States Patent
Wiley

(10) Patent No.: US 10,646,993 B1
(45) Date of Patent: May 12, 2020

(54) ROBOTS LINKABLE TO PERFORM TASKS IN COORDINATED TEAMS

(71) Applicant: Facebook, Inc., Menlo Park, CA (US)

(72) Inventor: Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 259 days.

(21) Appl. No.: 15/660,496

(22) Filed: Jul. 26, 2017

(51) Int. Cl.
| | | |
|---|---|---|
| *G06F 19/00* | (2018.01) | |
| *B25J 9/04* | (2006.01) | |
| *B25J 9/16* | (2006.01) | |
| *B25J 15/08* | (2006.01) | |
| *B25J 18/04* | (2006.01) | |
| *B25J 5/00* | (2006.01) | |
| *B25J 9/00* | (2006.01) | |

(52) U.S. Cl.
CPC ............... *B25J 9/042* (2013.01); *B25J 5/007* (2013.01); *B25J 9/16* (2013.01); *B25J 15/08* (2013.01); *B25J 18/04* (2013.01); *B25J 9/00* (2013.01)

(58) Field of Classification Search
CPC ..... B25J 9/042; B25J 5/007; B25J 9/16; B25J 15/08; B25J 18/04; B25J 9/00
See application file for complete search history.

(56) References Cited

U.S. PATENT DOCUMENTS

| | | | | |
|---|---|---|---|---|
| 2010/0025964 | A1* | 2/2010 | Fisk | B60D 1/04 280/444 |
| 2013/0226340 | A1* | 8/2013 | Buchstab | B25J 5/04 700/245 |
| 2013/0226341 | A1* | 8/2013 | Sturm | B25J 5/007 700/245 |
| 2013/0310982 | A1* | 11/2013 | Scheurer | B25J 9/1664 700/263 |
| 2017/0182666 | A1* | 6/2017 | Szarski | B25J 9/1664 |
| 2018/0186001 | A1* | 7/2018 | Scheurer | B25J 9/162 |
| 2018/0236862 | A1* | 8/2018 | Peng | B60K 1/00 |
| 2018/0281178 | A1* | 10/2018 | Jacobsen | B25J 5/007 |
| 2018/0345492 | A1* | 12/2018 | Watanabe | G05B 19/42 |

* cited by examiner

*Primary Examiner* — Harry Y Oh
(74) *Attorney, Agent, or Firm* — FisherBroyles, LLP

(57) ABSTRACT

A robot may include (1) a body having a pivot member, (2) a mobility subsystem, coupled to the body of the robot, that provides omnidirectional displacement of the robot along a plane, (3) a robotic arm, coupled to the body of the robot, for manipulating an object, and (4) a linking extension. The linking extension may include (1) a proximal end that is rotatably coupled to the pivot member of the body of the robot, and (2) a distal end that is dimensioned to rotatably couple to a coupling member of an assistant robot such that the linking extension links the robot and the assistant robot. The robot may also include a control subsystem, communicatively coupled to the mobility subsystem, that coordinates displacement of the robot by the mobility subsystem with displacement of the assistant robot. Various other apparatuses, systems, and methods are also disclosed.

20 Claims, 11 Drawing Sheets

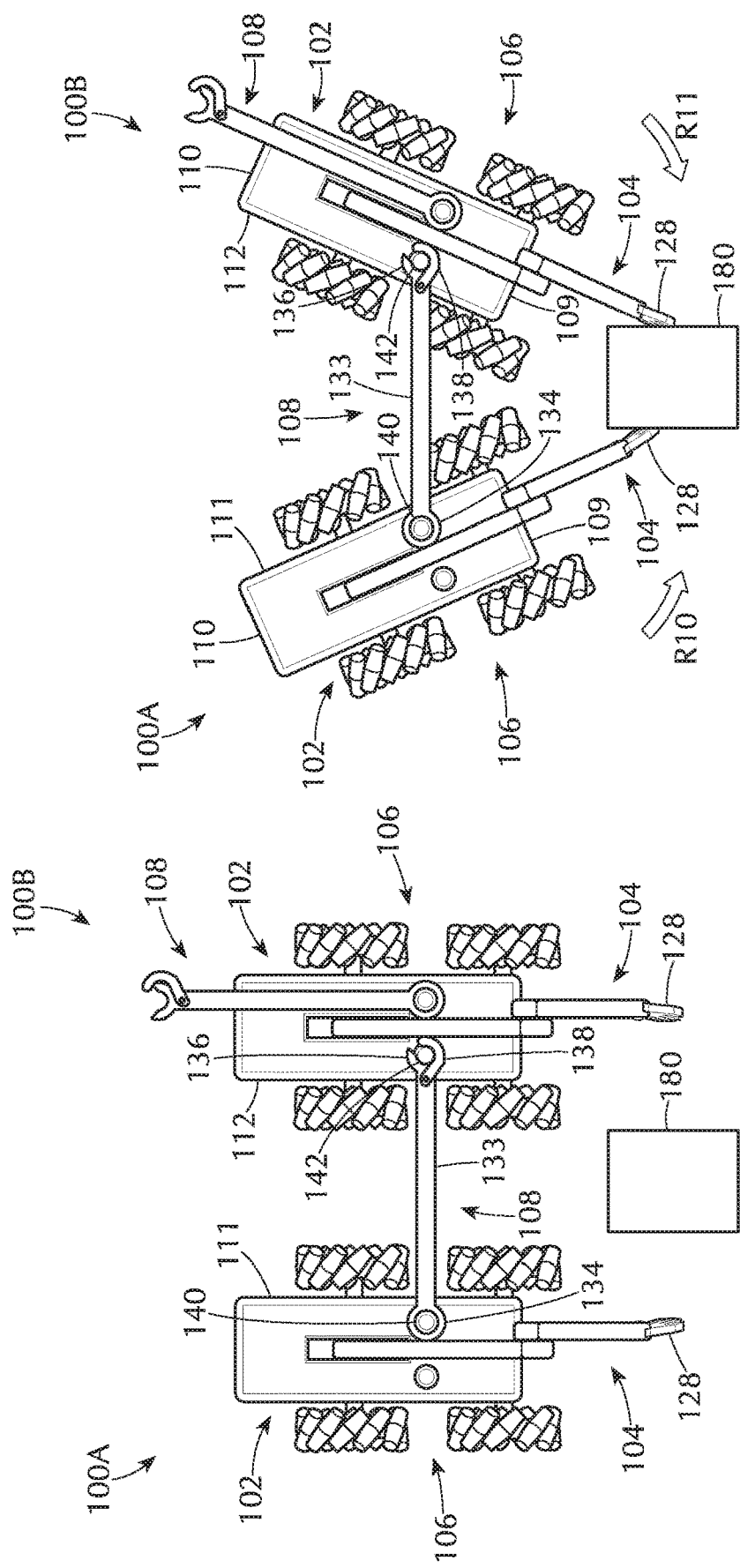

ROBOTS LINKABLE TO PERFORM TASKS IN COORDINATED TEAMS

BACKGROUND

Advances in robotics technology have resulted in the increasing use of robots in a variety of situations to carry out a multitude of activities. Various types of robots are commonly used in industry to improve productivity and reduce costs. Robots may also improve the health and safety of individuals by performing tasks in harsh or dangerous environments. Robots are also frequently used to perform many repetitive tasks that may be undesirable or for which there may be little room for error. While many processes are well-suited for automation using robots, is has proven difficult and costly to design and build robots that are able to lift and move certain objects, particularly large or heavy objects.

SUMMARY

As will be described in greater detail below, the instant disclosure generally relates to robots, and systems and methods for linking and coordinating movements of multiple robots. In one example, a robot may include (1) a body having a pivot member, (2) a mobility subsystem, coupled to the body of the robot, that provides omnidirectional displacement of the robot along a plane, (3) a robotic arm, coupled to the body of the robot, for manipulating an object, and (4) a linking extension. The linking extension may include (1) a proximal end that is rotatably coupled to the pivot member of the body of the robot, and (2) a distal end that is dimensioned to rotatably couple to a coupling member of an assistant robot such that the linking extension links the robot and the assistant robot. The robot may also include a control subsystem, communicatively coupled to the mobility subsystem, that coordinates displacement of the robot by the mobility subsystem with displacement of the assistant robot.

In some embodiments, the control subsystem may also coordinate movement of the robotic arm of the robot relative to the body of the robot with movement of a robotic arm of the assistant robot. The robotic arm of the robot may be movable relative to the body of the robot in a direction that is not parallel to the plane. In this example, movement of the robotic arm of the robot relative to the body of the robot may be constrained in a direction that is parallel to the plane. The mobility subsystem may displace the robot along a surface and the robotic arm of the robot may be movable toward and away from the surface.

According to at least one embodiment, the robotic arm of the robot may include (1) a main arm segment coupled to the body of the robot and (2) an extending arm segment coupled to the main arm segment such that the extending arm segment is movable relative to the main arm segment. In this example, the extending arm segment may be rotatable relative to the main arm segment about a rotational axis and movement of the extending arm segment along the rotational axis relative to the body of the robot may be constrained.

According to some embodiments, the linking extension of the robot may be rotatable about the pivot member of the body of the robot in a direction parallel to the plane. The linking extension of the robot may also include a movable locking member that releasably secures the distal end of the linking extension to the coupling member of the assistant robot. In at least one example, the mobility subsystem of the robot may include a plurality of omnidirectional wheels coupled to the body of the robot and the control subsystem may coordinate movement of each of the plurality of omnidirectional wheels. In some examples, the robot may also include a sensor that detects at least one of the object or the assistant robot.

In at least one embodiment, a related system may include a primary robot having (1) a body that includes a pivot member, (2) a mobility subsystem, coupled to the body of the primary robot, that provides omnidirectional displacement of the primary robot along a plane, (3) a robotic arm, coupled to the body of the primary robot, for manipulating an object, (4) a linking extension that includes a proximal end that is rotatably coupled to the pivot member of the body of the primary robot and a distal end, and (5) a control subsystem communicatively coupled to the mobility subsystem of the primary robot. The system may also include an assistant robot having (1) a body that includes a coupling member, (2) a mobility subsystem, coupled to the body of the assistant robot, that provides omnidirectional displacement of the assistant robot along the plane, (3) a robotic arm, coupled to the body of the assistant robot, for manipulating the object, and (4) a control subsystem communicatively coupled to the mobility subsystem of the assistant robot. The distal end of the linking extension of the primary robot may be dimensioned to rotatably couple to the coupling member of the assistant robot such that the linking extension links the primary robot and the assistant robot. Additionally, the control subsystem of the primary robot and the control subsystem of the assistant robot may coordinate displacement of the primary robot by the mobility subsystem of the primary robot with displacement of the assistant robot by the mobility subsystem of the assistant robot.

In some embodiments, at least one of the control subsystem of the primary robot or the control subsystem of the assistant robot may displace at least one of the primary robot or the assistant robot to hold the object between the robotic arm of the primary robot and the robotic arm of the assistant robot, when the primary robot is coupled to the assistant robot by the linking extension, by at least one of (1) controlling, by the control subsystem of the primary robot, the mobility subsystem of the primary robot to rotate the body of the primary robot relative to the linking extension to move the robotic arm of the primary robot toward the robotic arm of the assistant robot, or (2) controlling, by the control subsystem of the assistant robot, the mobility subsystem of the assistant robot to rotate the body of the assistant robot relative to the linking extension to move the robotic arm of the assistant robot toward the robotic arm of the primary robot.

According to at least one embodiment, the control subsystem of the primary robot and the control subsystem of the assistant robot may also coordinate movement of the robotic arm of the primary robot with movement of the robotic arm of the assistant robot to raise or lower the object held between the robotic arm of the primary robot and the robotic arm of the assistant robot. In some examples, at least one of the control subsystem of the primary robot or the control subsystem of the assistant robot may displace at least one of the primary robot or the assistant robot to couple the distal end of the linking extension to the coupling member of the assistant robot by at least one of (1) controlling, by the control subsystem of the primary robot, the mobility subsystem of the primary robot to displace the primary robot relative to the assistant robot, or (2) controlling, by the control subsystem of the assistant robot, the mobility subsystem of the assistant robot to displace the assistant robot relative to the primary robot.

According to some embodiments, the system may include an external computing device that is external to the primary robot and the assistant robot and that is communicatively coupled to at least one of a communication subsystem of the primary robot or a communication subsystem of the assistant robot. In this example, the control subsystem of the primary robot and the control subsystem of the assistant robot may coordinate the displacement of the primary robot with the displacement of the assistant robot based on data received from the external computing device via at the least one of the communication subsystem of the primary robot or the communication subsystem of the assistant robot. In at least one example, a communication subsystem of the primary robot may be communicatively coupled to a communication subsystem of the assistant robot. In this example, the control subsystem of the primary robot and the control subsystem of the assistant robot may coordinate the displacement of the primary robot with the displacement of the assistant robot based on data exchanged between the communication subsystem of the primary robot and the communication subsystem of the assistant robot.

A corresponding method may include coupling a distal end of a linking extension of a primary robot to a coupling member of an assistant robot such that the linking extension links the primary robot and the assistant robot. The primary robot may include (1) a body having a pivot member that is rotatably coupled to a proximal end of the linking extension, (2) a mobility subsystem, coupled to the body of the primary robot, that provides omnidirectional displacement of the primary robot along a plane, and (3) a robotic arm, coupled to the body of the primary robot, for manipulating an object. The method may also include coordinating displacement of the primary robot by the mobility subsystem with displacement of the assistant robot.

In at least one embodiment, the method may also include coordinating movement of the robotic arm of the primary robot relative to the body of the primary robot with movement of a robotic arm of the assistant robot. In some examples, the method may include controlling the mobility subsystem of the primary robot to rotate the body of the primary robot relative to the linking extension to move the robotic arm of the primary robot toward a robotic arm of the assistant robot to hold the object between the robotic arm of the primary robot and the robotic arm of the assistant robot.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 5A-5D are top views of an exemplary primary robot and an exemplary assistant robot.

Figure 1A:
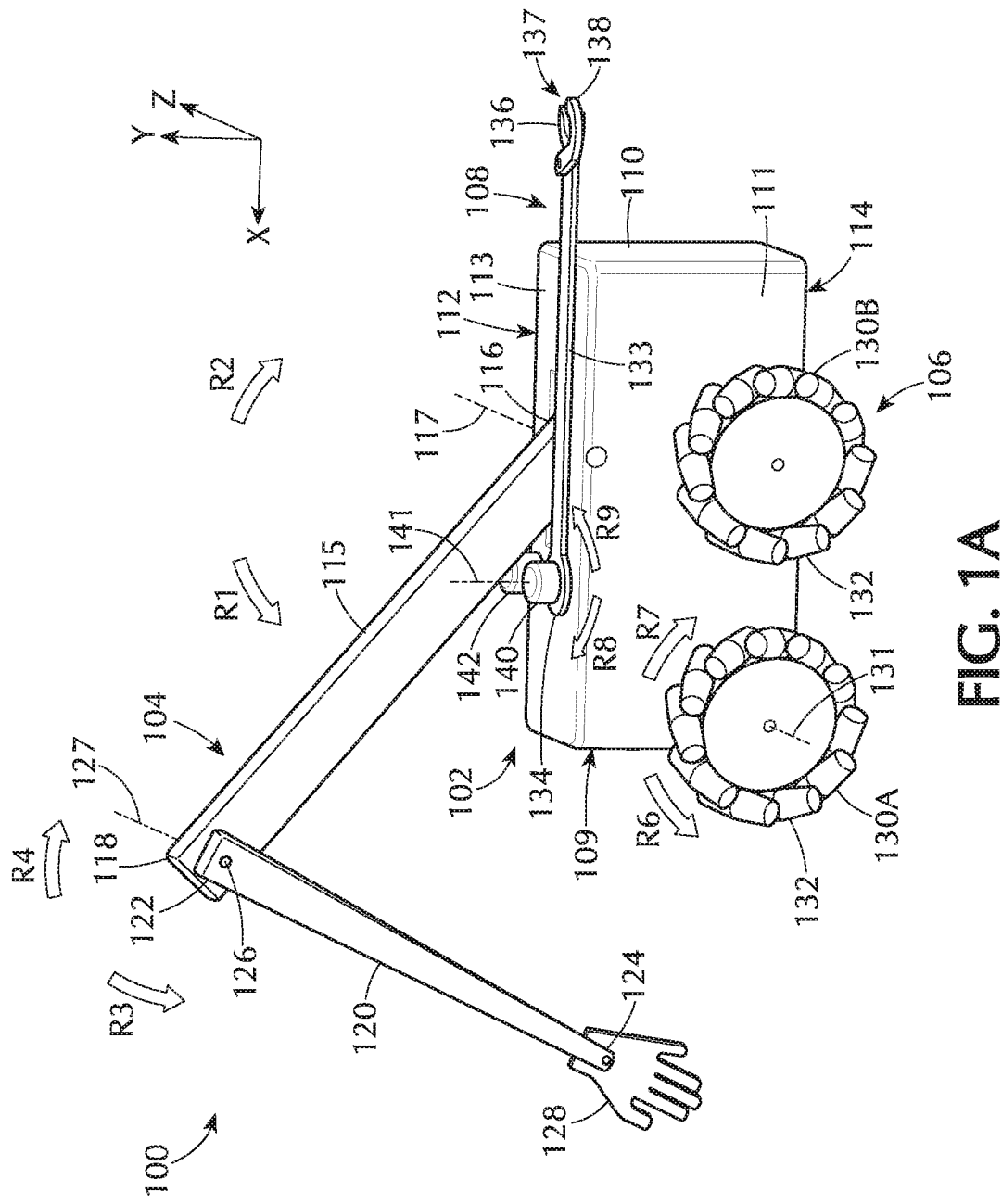
FIGS. 1A and 1B are perspective views of an exemplary robot in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various robots, and systems and methods for linking and coordinating movements of multiple robots. As will be explained in greater detail below, embodiments of the instant disclosure may include robots that are linkable to other robots via a linking extension. For example, the linking extension may secure two robots together in a team to extend the functionality of the robots. Each of the robots may be displaced in any direction along a surface or plane and the linking extension may be rotatably coupled to each of the robots such that the robots may be displaced rotationally relative to each other while they are linked. The robots may each include a robotic arm to grasp or otherwise manipulate an object. Movements of the robots may be coordinated to hold the object between the robotic arms of the linked robots and to raise, lower, move and/or otherwise manipulate the object. Movements of the robots may also be coordinated to link or unlink the robots via the linking extension.

Accordingly, such robots may be utilized together as a team to grasp and lift various objects, including relatively heavy and/or dimensionally large objects. The linking extension may join the robots together in a shoulder-like manner such that each of the robots has a constrained degree of movement enabling the robots to more effectively and securely grasp and handle such objects. Because the robots may be linked together to perform the grasping and lifting actions, the complexity and cost of the robots may be minimized. Additionally, the robots may be readily linked and unlinked autonomously, enabling the robots to work together for a period of time without outside intervention to join, and subsequently separate, the robots as a team. Robots described herein may be utilized in any suitable environments and conditions, without limitation. For example, disclosed robots may be utilized in data centers, industrial environments (e.g., factories, plants, etc.), warehouses (e.g., storage warehouses, shipping warehouses, etc.), construction sites, buildings, vehicles, outdoor spaces, and/or any other suitable environment or location, without limitation.

The following will provide, with reference to FIGS. 1-4A and 7, examples of robots that are linkable to other corresponding robots. In addition, the discussion corresponding to FIGS. 4B-6 will provide examples of systems for linking and coordinating movements of multiple robots. Finally, the discussion corresponding to FIG. 8 will provide examples of methods for linking and coordinating movements of multiple robots.

Figure 1B:
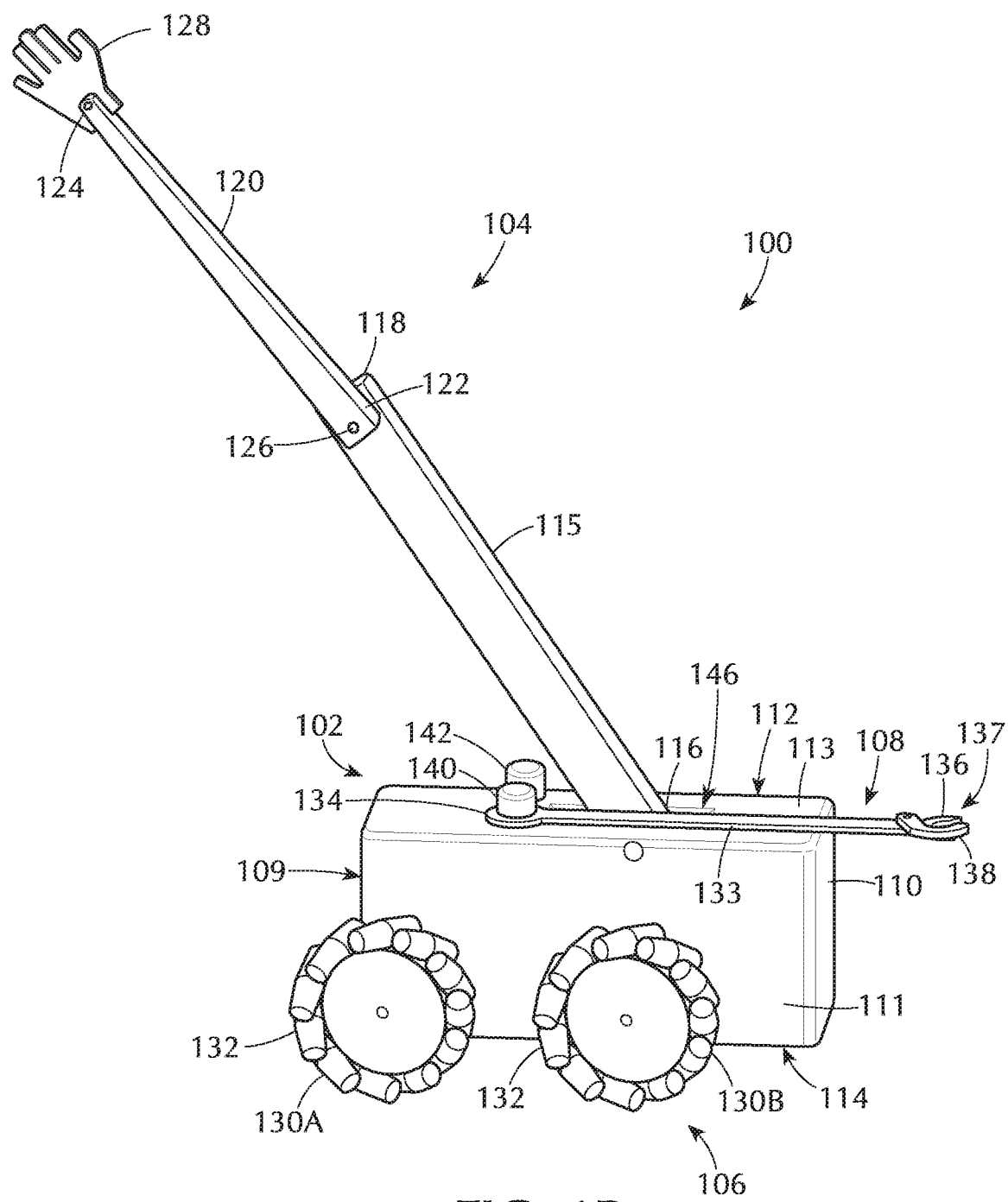

FIGS. 1A and 1B show a robot 100 in accordance with some embodiments. As shown in these figures, robot 100 may include a body 102, a robotic arm 104, a mobility subsystem 106, and a linking extension 108. Body 102 of robot 100 may be any suitable shape or size, without limitation. For example, body 102 may have a rectangular cuboid shape that includes a forward surface 109, a rearward surface 110, a side surface 111, a side surface 112, an upper surface 113, and a lower surface 114 as shown in FIGS. 1A and 1B. Body 102 may house various components of robot 100. For example, body 102 may include a computing device (see, e.g., FIG. 4A) with a processor, memory, and control subsystem that controls various functions and activities carried out by robot 100. Body 102 may also include mechanical components, such as one or more motors, that drive movements of robotic components (e.g., robotic arm 104, mobility subsystem 106, linking extension 108, etc.) coupled to body 102. Various motors suitable for driving one or more of the components described herein may include, for example, brushless DC motors, brush-type DC motors, servo motors, stepper motors (e.g., unipolar or bipolar stepper motors), permanent magnet motors, and/or any other suitable type of motor, without limitation.

In some examples, body 102 may include a pivot member 140 and a coupling member 142 that are utilized in joining robot 100 to another robot. Pivot member 140 and coupling member 142 may each, for example, include a post or peg-like protrusion extending from upper surface 113 of robot 100. In some examples, body 102 may include a single protrusion that acts as both a pivot member and a coupling member. Robotic arm 104 may be coupled to body 102 such that robotic arm 104 extends from body 102. In at least one embodiment, an end portion of robotic arm 104 may be disposed within a longitudinally extending recess 146 (see, FIG. 1B) defined by body 102. For example, a proximal end of robotic arm 104 may be coupled to body 102 within recess 146 such that robotic arm 104 is rotatable about a rotational axis 117 (e.g., an axis extending along the Z dimension shown in FIG. 1A) in rotational directions R1 and R2 with respect to body 102 and such that robotic arm 104 moves within recess 146 in a lengthwise direction of recess 146. Robotic arm 104 may be connected to a pivot or joint (not shown) within recess 146 and may be rotated by, for example, a motor, such as an electric motor, of body 102.

According to some embodiments, robotic arm 104 may include a plurality of sections, including at least one longitudinally extending section, that are coupled to each other via one or more joints that are independently movable with respect to each other and/or body 102. For example, robotic arm 104 may include a main arm segment 115 that is coupled to an extending arm segment 120. Main arm segment 115 may include a proximal end 116 that is coupled to body 102 and a distal end 118 opposite proximal end 116. Extending arm segment 120 may include a proximal end 122 that is coupled to main arm segment 115 at, for example, distal end 118 of main arm segment 115. Extending arm segment 120 may also include a distal end 124 opposite proximal end 122. Main arm segment 115 and extending arm segment 120 may each include any suitable material, without limitation. For example, main arm segment 115 and/or extending arm segment 120 may include a rigid or substantially rigid material, such as a rigid polymeric, metal, composite (e.g., carbon, fiberglass, etc.), and/or other material. Extending arm segment 120 may be rotatably coupled to main arm segment 115 by an arm joint 126 such that extending arm segment 120 is rotatable about a rotational axis 127 (e.g., an axis extending along the Z dimension shown in FIG. 1A) relative to main arm segment 115 in rotational directions R3 and R4. Extending arm segment 120 may be rotated by, for example, a motor, such as an electric motor, that is located within main arm segment 115 or extending arm segment 120. In some embodiments, robotic arm 104 may include only a single arm segment that is coupled to body 102 and that does not include a rotatable joint. In at least one example, recess 146 may extend to forward surface 109 and/or rearward surface 110 and/or along at least a portion of forward surface 109 and/or rearward surface 110 (see, e.g., recess 246 shown in FIG. 7) so as to provide robotic arm an additional degree of movement in rotational direction R1 and/or rotational direction R2.

In at least one embodiment, main arm segment 115 and extending arm segment 120 may, for example, be rotated between a lowered position shown in FIG. 1A and a raised position shown in FIG. 1B. Main arm segment 115 and extending arm segment 120 may be independently rotated to position main arm segment 115 and extending arm segment 120 in numerous other orientations, without limitation. In some examples, movement of main arm segment 115 and extending arm segment 120 of robotic arm 104 may be limited or substantially limited to movement along a plane extending in the X and Y dimensions shown in FIG. 1A relative to body 102. As such, robotic arm 104 may be movable toward and away from a surface on which robot 100 is disposed (i.e., a surface extending in the X and Z dimensions shown in FIG. 1A). Robotic arm 104 may therefore be utilized to manipulate an object disposed at various heights relative to robot 100. Additionally, robotic arm 104 may be utilized, in combination with a robotic arm of another robot, to raise and lower an object and to move the object in any suitable direction. In at least one example, movement of robotic arm 104 relative to body 102 may be constrained or substantially constrained in a direction that is parallel to the surface on which robot 100 is disposed. For example, movement of robotic arm 104 along the Z dimension relative to body 102 may be limited.

In at least one embodiment, a gripping member 128 may be coupled to distal end 124 of extending arm segment 120. Gripping member 128 may be configured to contact and manipulate an object, as will be described in greater detail below with respect to FIGS. 5C-6. Gripping member 128 may be any suitable shape or size, without limitation. For example, as shown in FIGS. 1A and 1B, gripping member 128 may have a flattened or generally flattened shape that includes one or more finger-like protrusions extending from a main portion of gripping member 128 that facilitate close contact with various object shapes and surfaces. Gripping member 128 may be formed of any material suitable for contacting and/or otherwise manipulating an object. For example, gripping member 128 may include a resilient or substantially resilient material, such as, for example, a flexible polymeric material that is bendable and/or conformable to a portion of an object surface. In some examples, gripping member 128 may include a material having a relatively high coefficient of friction with respect to an object surface to facilitate holding and/or manipulation of the object.

Mobility subsystem 106, which provides omnidirectional displacement of robot 100, may be coupled to at least a portion of body 102. According to at least one example, mobility subsystem 106 may include a holonomic drive system having a plurality of wheels that are attached to body 102 via corresponding axles. For example, a front wheel 130A and a rear wheel 130B that are coupled to body 102 adjacent side surface 111 are visible in FIGS. 1A and 1B. Mobility subsystem 106 may also include corresponding wheels coupled adjacent opposite side surface 112 (see, e.g., front wheel 130C and rear wheel 130D illustrated in FIG. 2). Each of wheels 130A, 130B, 130C, and 130D may be independently rotated about a corresponding rotational axis 131 (e.g., an axis extending along the Z dimension shown in FIG. 1A) in rotational directions R6 and R7 relative to body 102. Wheels 130A, 130B, 130C, and 130D may each be any type of omnidirectional wheel (e.g., MECANUM wheels, omni wheels, poly wheels, etc.) suitable for moving robot 100 in any or substantially any direction along a surface. In at least one embodiment, as shown in FIG. 1A, wheels 130A, 130B, 130C, and 130D may be MECANUM wheels having a plurality of angled rollers 132 that contact a surface during use, enabling omnidirectional movement of robot 100.

Figure 2:
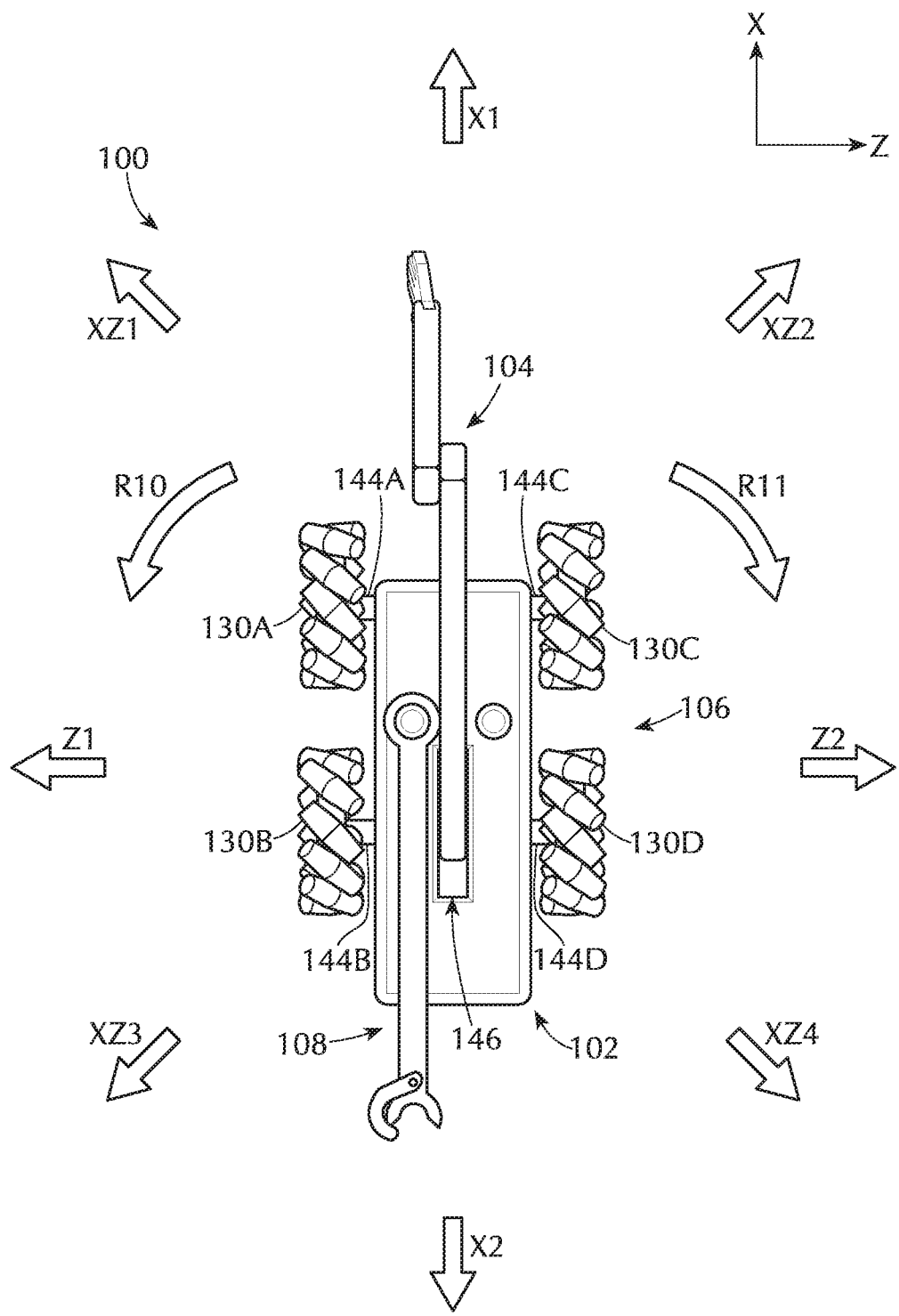
FIG. 2 is a top view of an exemplary robot in accordance with some embodiments.

FIG. 2 illustrates omnidirectional movement of robot 100 provided by mobility subsystem 106. This figure shows a top view of robot 100 and illustrates omnidirectional movement of robot 100 along a plane and/or surface extending in the X and Z dimensions shown in FIG. 1A. In some embodiments, front wheel 130A and front wheel 130C may be coupled to body 102 by front axle 144A and front axle 144C, respectively. Each of front axles 144A and 144C and rear axles 144B and 144D may be coupled to a separate motor, such as an electric motor, disposed, for example, within body 102. Each of front axles 144A and 144C and rear axles 144B and 144D may be independently driven by a corresponding motor in a selected rotational direction (e.g., rotational direction R6 or rotational direction R7 shown in FIG. 1A) and at a selected rotational speed. For example, rotating each of front axles 144A and 144C and rear axles 144B and 144D in the same rotational direction at the same rotational speed may displace robot 100 in forward direction X1 or rearward direction X2. Rotating two or more of front axles 144A and 144C and rear axles 144B and 144D in opposite directions and/or at different rotational speeds may displace robot 100 in, for example, sideward direction Z1 or Z2, rotational direction R10 or R11, diagonal directions XZ1, XZ2, XZ3, or XZ4, or any other direction along the plane.

Returning to FIGS. 1A and 1B, linking extension 108 may be coupled to body 102. For example, linking extension 108 may be coupled to pivot member 140 on upper surface 113 of body 102. Pivot member 140 may, for example, include a cylindrical post or other suitably shaped protrusion that protrudes from upper surface 113. In at least one embodiment, linking extension 108 may include a proximal end 134 having a hole or recess that at least partially surrounds a portion of pivot member 140. Linking extension 108 may be rotatably coupled to pivot member 140 such that linking extension 108 is rotatable about a rotational axis 141 (e.g., an axis extending along the Y dimension shown in FIG. 1A) in rotational directions R8 and R9. Linking extension 108 may include an extension portion 133 that extends from proximal end 134 to a distal end 136 of linking extension 108. As shown in FIGS. 1A and 1B, at least a portion of linking extension 108 may abut upper surface 113 of body 102 when linking extension 108 is in at least one position. At least a portion of linking extension 108, including distal end 136, may extend away from body 102. For example, when linking extension 108 is not coupled to another robot, linking extension may extend along the X dimension shown in FIG. 1A relative to body 102 such that distal end 136 and a portion of extension portion 133 extend in rearward direction away from rearward surface 110. According to some embodiments, distal end 136 of linking extension 108 may be dimensioned to rotatably couple to a portion of another robot. For example, distal end 136 may define a coupling recess 137 that is configured to surround at least a portion of a coupling member (e.g., coupling member 142) of another robot. In at least one example, linking extension 108 may also include a locking member 138 at distal end 136 that releasably secures distal end 136 to the coupling member of the other robot.

Figure 3A:
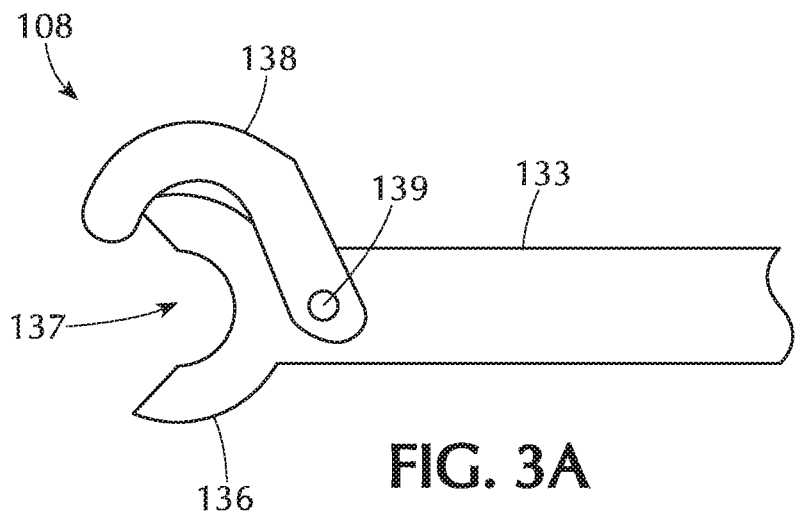
FIGS. 3A and 3B are top views of a portion of an exemplary linking extension of a robot in accordance with some embodiments.
Figure 3B:
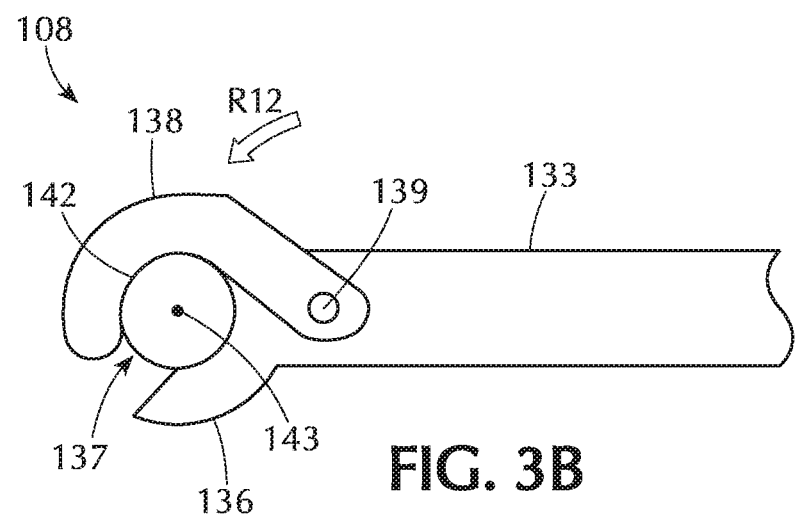

FIGS. 3A and 3B show a portion of linking extension 108, including distal end 136 and locking member 138. As shown in FIG. 3A, prior to being coupled to a coupling member of another robot, locking member 138 may be disposed in an open position that allows the coupling member to be positioned with in coupling recess 137 defined by distal end 136. In some embodiments, locking member 138 may be movable between the open position shown in FIG. 3A and a closed position shown in FIG. 3B. For example, locking member 138 may be coupled to distal end 136 at a locking member pivot 139 such that locking member 138 is rotatable about locking member pivot 139 relative to distal end 136. Linking extension 108 may include any suitable material, without limitation. For example, linking extension 108 may include a rigid or substantially rigid material, such as a rigid polymeric, metal, composite (e.g., carbon, fiberglass, etc.), and/or other material.

In some embodiments, when a coupling member of another robot is disposed within coupling recess 137 defined by distal end 136, locking member 138 may rotate in rotational direction R12 shown in FIG. 3B. For example, when a coupling member 142 of another robot is disposed within coupling recess 137, locking member 138 may rotate in rotational direction R12 to rotatably secure linking extension 108 to coupling member 142 of the other robot. Coupling member 142 may, for example, include a cylindrical post or other suitably shaped protrusion that protrudes from an upper surface 113 of the other robot (see, e.g., FIGS. 1A and 1B). When locking member 138 is disposed in the closed position shown in FIG. 3B, linking extension 108 may be rotatable about coupling member 142, which is centered around a rotational axis 143. Locking member 138 may be rotated from the open position shown in FIG. 3A to the closed position shown in FIG. 3B in any suitable manner. For example, linking extension 108 may include a spring actuated mechanism that automatically rotates locking member 138 into the closed position when coupling member 142 is positioned in coupling recess 137. In some examples, linking extension 108 may include a motor or other suitable mechanism that rotates locking member 138 from the open position to the closed position. In at least one example, linking extension 108 may be releasably secured to coupling member 142. For example, the other robot may apply a force to locking member 138 via coupling member 142 in a specified direction (e.g., a direction substantially parallel to a longitudinal direction of extension portion 133 of linking extension 108) to force locking member 138 into the open position. According to some examples, locking member 138 may be opened by a motor or other suitable mechanism of linking extension 108.

Figure 4A:
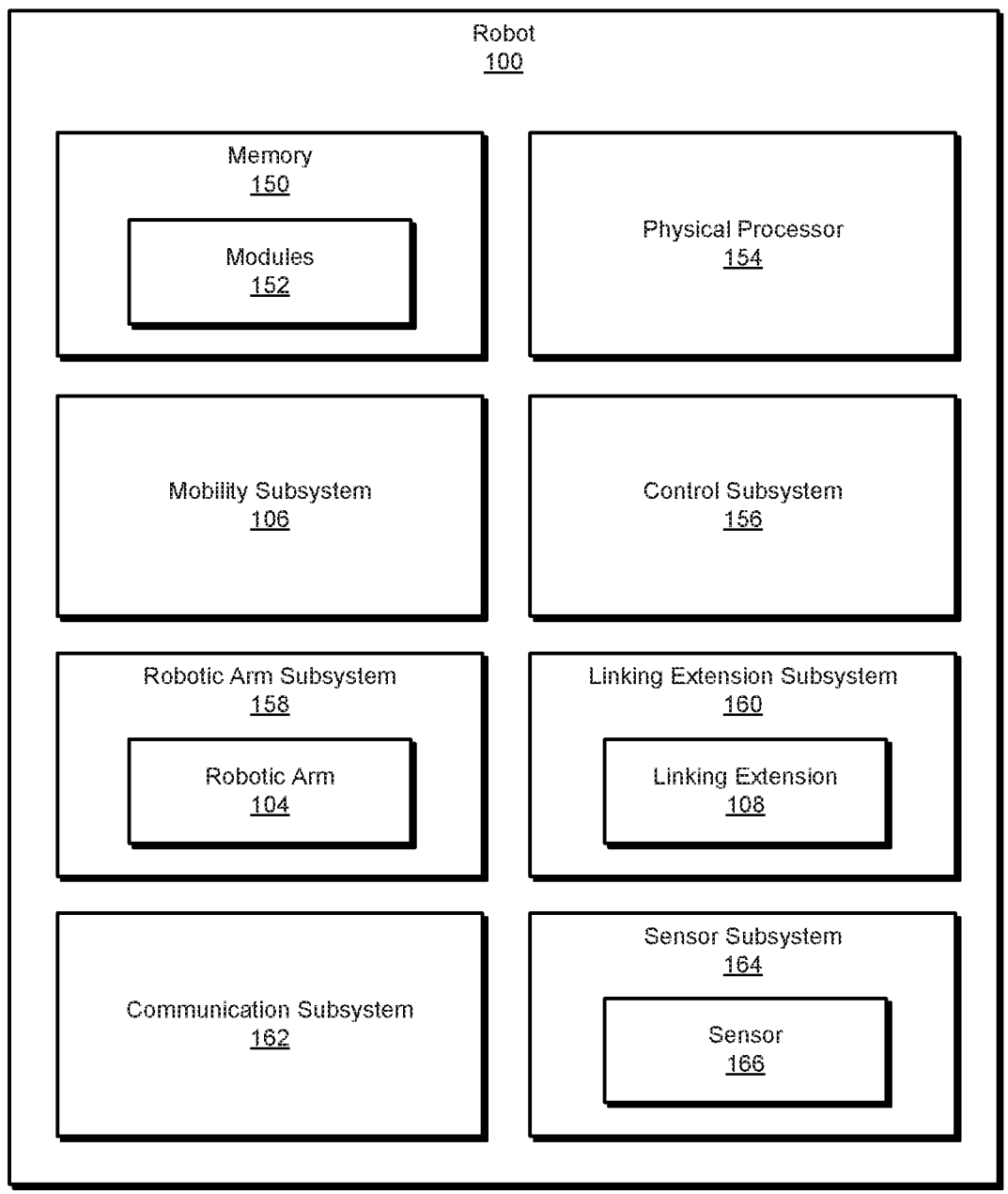
FIG. 4A is a block diagram of an exemplary robot in accordance with some embodiments.

FIG. 4A is a block diagram of robot 100 showing various system components, including computing device components, of robot 100. As illustrated in this figure, robot 100 may include at least one computing device that performs one or more tasks and transforms data by outputting instructions and/or signals that are utilized to perform various mechanical actions as described herein.

In some embodiments, robot 100 may include one or more memory devices, such as memory 150. Memory 150 generally represents any type or form of volatile or non-volatile storage device or medium capable of storing data and/or computer-readable instructions. In one example, memory 150 may store, load, and/or maintain one or more modules 152 for performing various functions in relation to one or more of the subsystems described herein. Examples of memory 150 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. In certain embodiments, modules 152 in FIG. 4A may represent one or more software applications or programs that, when executed by robot 100, may cause robot 100 to perform one or more actions and/or tasks, such as actions performed by one or more subsystems (e.g., control subsystem 156, mobility subsystem 106, robotic arm subsystem 158, linking extension subsystem 160, communication subsystem 162, sensor subsystem 164, etc.) of robot 100 as described here.

As illustrated in FIG. 4A, robot 100 may also include one or more physical processors, such as physical processor 154. Physical processor 154 generally represents any type or form of hardware-implemented processing unit capable of interpreting and/or executing computer-readable instructions. In one example, physical processor 154 may access and/or modify one or more of modules 152 stored in memory 150. Additionally or alternatively, physical processor 154 may execute one or more of modules 152 to facilitate various actions performed by robot 100. Examples of physical processor 154 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Robot 100 may also include one or more subsystems for performing one or more tasks. For example, as shown in FIG. 4A, robot 100 may include a control subsystem 156 for controlling one or more other subsystems and/or components of robot 100. For example, control subsystem 156 may direct one or more other subsystems of robot 100 to carry out various actions and/or tasks. Additionally, control subsystem 156 may coordinate actions and/or tasks performed by various subsystems of robot 100 with each other and/or with one or more systems and/or devices external to robot 100. For example, as will be described in greater detail below, control subsystem 156 of may coordinate various movements and/or actions of robot 100 with movements and/or actions of another robot. In some embodiments, control subsystem 156 may control movements by mobility subsystem 106 such that control subsystem 156 controls mobility subsystem 106 to displace robot 100 in one or more directions (see, e.g., FIG. 2). In at least one embodiment, control subsystem 156 may control movements by robotic arm subsystem 158 and/or linking extension subsystem 160 to respectively control movements of robotic arm 104 and/or linking extension 108 (see, e.g., FIGS. 1A and 1B) of robot 100.

Robot 100 may include mobility subsystem 106. As described above, mobility subsystem 106 may provide omnidirectional displacement of robot 100 along a plane and/or surface. Mobility subsystem 106 may, for example, include wheels that are each independently rotatable to displace robot 100 in any or substantially any direction along the plane. Robot 100 may also include a robotic arm subsystem 158 that includes robotic arm 104, and a linking extension subsystem 160 that includes linking extension 108. In some embodiments, robot 100 may include a communication subsystem 162 that communicates with one or more robots and/or other computing devices external to robot 100 using any suitable communication technology and/or standard. For example, communication subsystem 162 may include a communication antenna to wirelessly exchange data with one or more other devices as will be described in greater detail below with reference to FIG. 4B.

According to at least one embodiment, robot 100 may also include a sensor subsystem 164. Sensor subsystem 164 may include at least one sensor 166 that is utilized by robot 100 to determine at least one of a location and/or orientation of at least one of robot 100, another robot external to robot 100, and/or an object to be manipulated by robot 100. At least one sensor 166 may additionally or alternatively be utilized to connect robot 100 to another robot and/or to manipulate an object in conjunction with the other robot. In some embodiments, the at least one sensor 166 may be utilized by robot 100 to navigate its surroundings. In some embodiments, robot 100 may utilize the at least one sensor 166 to identify an object and/or another robot by detecting and/or reading, for example, a barcode, a radio-frequency identification (RFID) chip, an identification pattern, etc. Examples of sensor 166 may include, for example, a light and/or optical sensor (e.g., a photoresistor, a camera, etc.), a contact and/or pressure sensor, a proximity and/or range sensor (e.g., an infrared transceiver, an ultrasonic sensor, etc.), a navigation and/or positioning sensor (e.g., a global positioning system sensor, a digital magnetic compass, a local positioning sensor, etc.), an acceleration sensor, and/or any other suitable sensor.

Figure 4B:
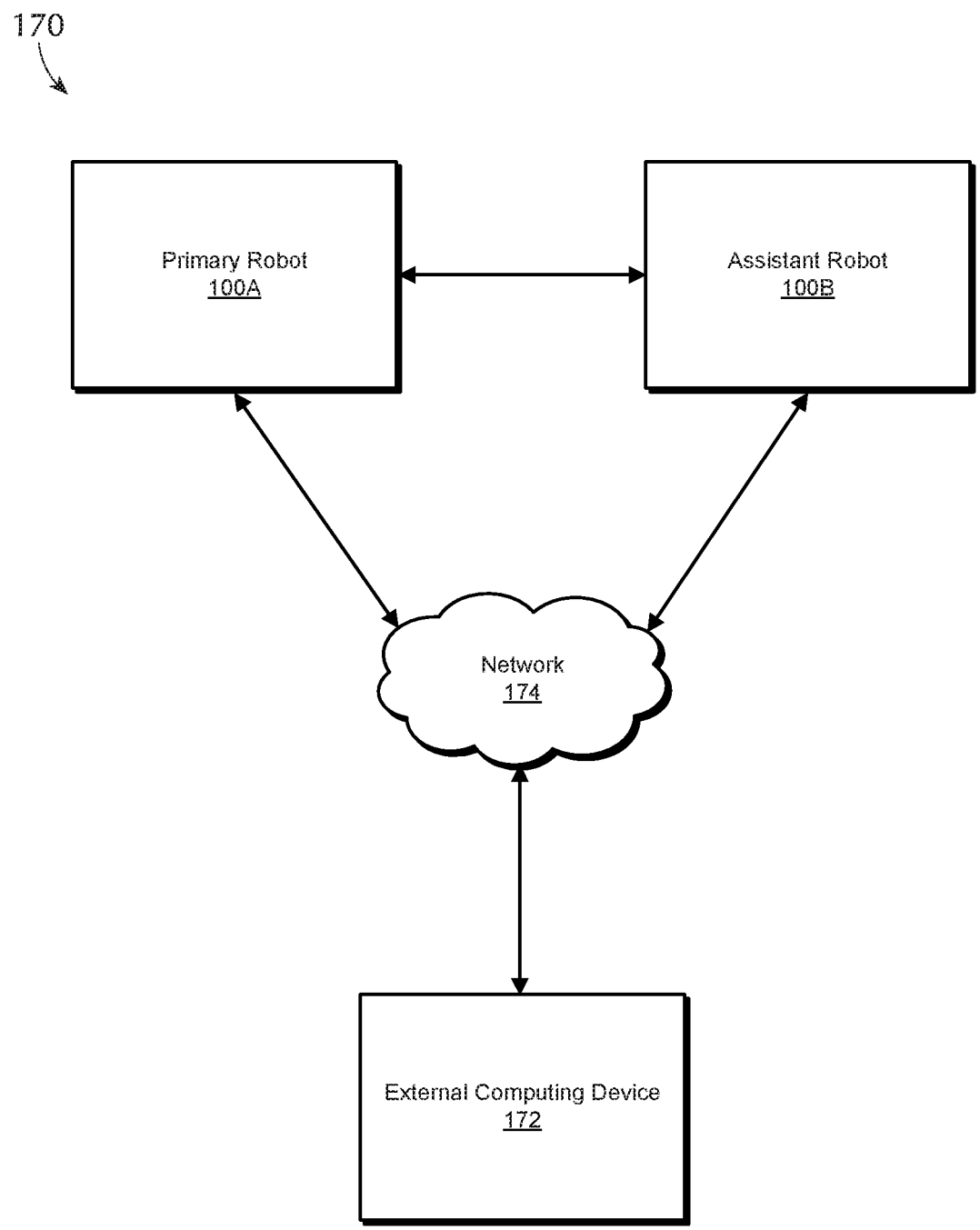
FIG. 4B is a block diagram of an exemplary system for linking and coordinating movements of multiple robots.

FIG. 4B shows a block diagram of an exemplary system 170 that includes a plurality of robots, including a primary robot 100A and assistant robot 100B, that may operate together as a team as described herein. Each of primary robot 100A and assistant robot 100B shown in this figure may include components of robot 100 illustrated in FIG. 4A. Primary robot 100A may communicate with assistant robot 100B to coordinate movements and/or actions of primary robot 100A and assistant robot 100B as will be described in greater detail below. In some embodiments, primary robot 100A may communicate directly with assistant robot 100B. Additionally or alternatively, primary robot 100A may communicate with assistant robot 100B via a network 174. In at least one example, a communication subsystem 162 of primary robot 100A may exchange data with a communication subsystem 162 of assistant robot 100B, and a control subsystem 156 of primary robot 100A and a control subsystem 156 of assistant robot 100B may coordinate movements of primary robot 100A with movements of assistant robot 100B based on the exchanged data (see, e.g., communication subsystem 162 and control subsystem 156 illustrated in FIG. 4A).

In at least one embodiment, primary robot 100A and/or assistant robot 100B may communicate with an external computing device 172 that is external to primary robot 100A and/or assistant robot 100B. External computing device 172 may, for example, send instructions and/or other data (e.g., positioning data) to primary robot 100A and/or assistant robot 100B. In some examples, external computing device 172 may send instructions to primary robot 100A and/or assistant robot 100B directing primary robot 100A and/or assistant robot 100B to coordinate their movements for purposes of joining primary robot 100A with assistant robot 100B (e.g., via linking extension 108 shown in FIGS. 1A and 1B) and/or for purposes of holding, lifting, moving, and/or otherwise manipulating a selected object. In some examples, external computing device 172 may, for example, transmit information to primary robot 100A and/or assistant robot 100B indicating a location of a selected object and/or a location of another robot For example, external computing device 172 may transmit to primary robot 100A a location identifier, such as a building coordinate, a global positioning system (GPS) coordinate, etc., that indicates a location of assistant robot 100B. According to some embodiments, primary robot 100A and/or assistant robot 100B may transmit data to external computing device 172 via network 174. For example, primary robot 100A and/or assistant robot 100B may transmit location data to external computing device 172 providing an updated location identifier for primary robot 100A and/or assistant robot 100B and/or for an object that has been moved by primary robot 100A and assistant robot 100B.

External computing device 172 generally represents any type or form of computing device that is capable of reading computer-executable instructions. Examples of external computing device 172 include, without limitation, servers, desktops, laptops, tablets, cellular phones, wearable devices, embedded systems, combinations of one or more of the same, or any other suitable computing device.

Network 174 generally represents any medium or architecture capable of facilitating communication or data transfer. In one example, network 174 may facilitate communication between external computing device 172, primary robot 100A, and/or assistant robot 100B. In this example, network 174 may facilitate communication or data transfer using wireless and/or wired connections. Examples of network 174 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 5A:
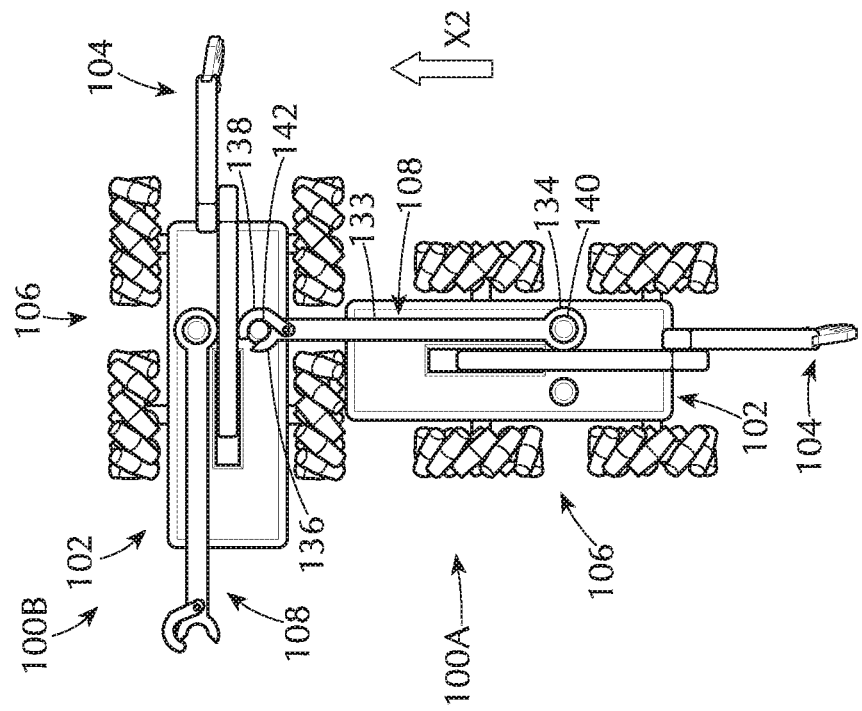
Figure 5B:
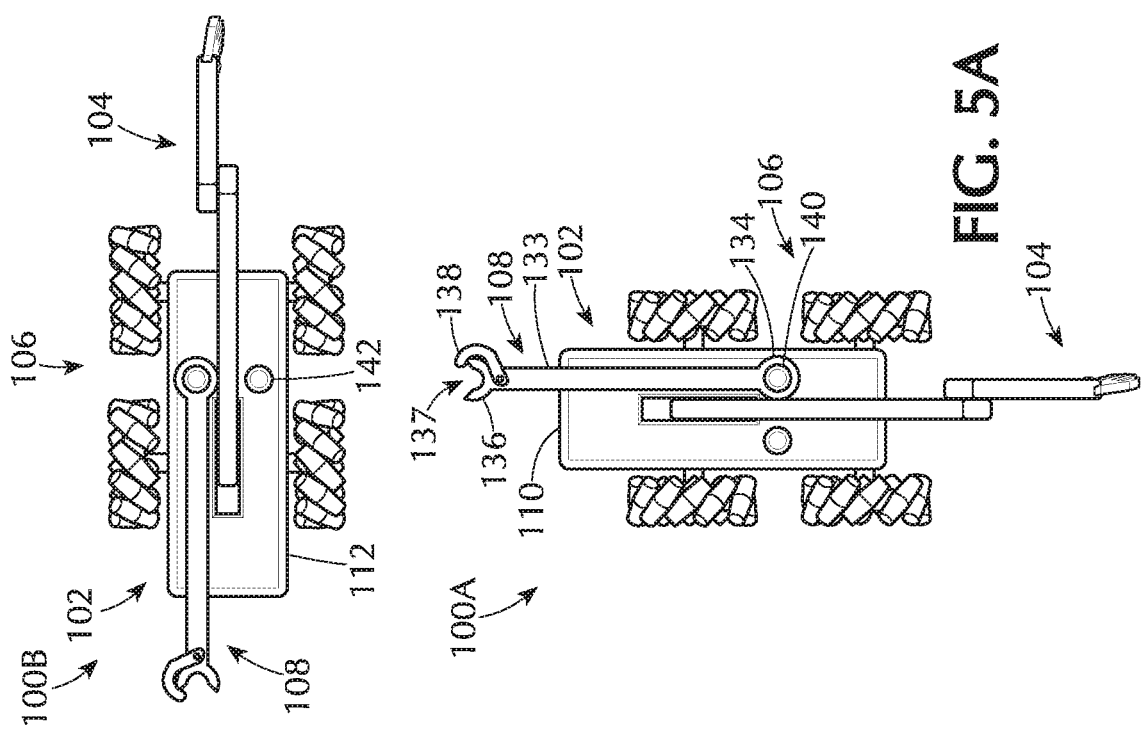

FIG. 5A-5D show primary robot 100A and assistant robot 100B as part of a system, such as system 170 illustrated in FIG. 4B. FIG. 5A illustrates primary robot 100A and assistant robot 100B in a condition where they are not connected. FIG. 5B illustrates coupling of primary robot 100A to assistant robot 100B via linking extension 108 of primary robot 100A. FIG. 5C illustrates positioning of joined primary robot 100A and assistant robot 100B in close proximity to an object 180. FIG. 5D illustrates primary robot 100A and assistant robot 100B positioned to hold object 180. Any of the actions and/or movements of primary robot 100A and/or assistant robot 100B shown in FIGS. 5A-5D may be controlled by a respective control subsystem (e.g., control subsystem 156 shown in FIG. 4A) of primary robot 100A and/or assistant robot 100B.

As shown in FIG. 5A, prior to linking primary robot 100A to assistant robot 100B, primary robot 100A may be positioned and oriented so that distal end 136 of linking extension 108 is suitably aligned to couple with coupling member 142 of assistant robot 100B. For example, as shown in FIG. 5A, primary robot 100A may be positioned relative to assistant robot 100B such that rearward surface 110 of primary robot 100A faces side surface 112 of assistant robot 100B. In some embodiments, distal end 136 of linking extension 108 of primary robot 100A may protrude beyond rearward surface 110 such that coupling recess 137 is aligned with and open toward coupling member 142 of assistant robot 100B. In at least one example, distal end 136 of linking extension 108 of primary robot 100A may protrude in other suitable direction from body 102 of primary robot 100A prior to coupling primary robot 100A to assistant robot 100B, without limitation. Additionally, as shown in FIG. 5A, locking member 138 of linking extension 108 of primary robot 100A may be disposed in an open position (see, e.g., FIG. 3A).

Subsequently, as shown in FIG. 5B, primary robot 100A may be displaced by mobility subsystem 106 in rearward direction X2 such that primary robot 100A moves toward assistant robot 100B. Additionally or alternatively, assistant robot 100B may displaced in a sideward direction toward primary robot 100A. Primary robot 100A and/or assistant robot 100B may be displaced until coupling member 142 of assistant robot 100B is at least partially surrounded by distal end 136 of linking extension 108 of primary robot 100A. Locking member 138 may rotate to a closed position (see, e.g., FIG. 3B) to partially surround and rotatably secured linking extension 108 to coupling member 142, as shown in FIG. 5B. Accordingly, primary robot 100A may be linked to assistant robot 100B, and primary robot 100A and assistant robot 100B may move relative to each other with a limited degree of movement. Control subsystem 156 of primary robot 100A and control subsystem 156 of assistant robot 100B (see, e.g., FIG. 4A) may coordinate movements of primary robot 100A and assistant robot 100B such that primary robot 100A moves in conjunction with assistant robot 100B. For example, control subsystem 156 of primary robot 100A and control subsystem 156 of assistant robot 100B may coordinate movements of individual omnidirectional wheels of primary robot 100A and/or assistant robot 100B to produce displacement of primary robot 100A and/or assistant robot 100B in any desired direction along a surface. Linking extension 108 of primary robot 100A may be rotatably secured to primary robot 100A at proximal end 134 and may be rotatably secured to assistant robot 100B at distal end 136. While FIG. 5B and the corresponding description above illustrates linking of primary robot 100A and assistant robot 100B through autonomous movement of primary robot 100A and/or assistant robot 100B, in some embodiments, primary robot 100A and assistant robot 100B may be linked together via linking extension 108 manually by a user and/or by another robot.

As shown in FIG. 5C, primary robot 100A and assistant robot 100B may be positioned near an object 180. In some embodiments, primary robot 100A may be positioned side-by-side with assistant robot 100B, as shown in FIG. 5C. For example, assistant robot 100B may follow in arcuate path while linked with primary robot 100A such that assistant robot 100B moves from the position shown in FIG. 5B to the position shown in FIG. 5C. Additionally or alternatively, primary robot 100A may rotate separately or in conjunction with displacement of assistant robot 100B to the position shown in FIG. 5C. Primary robot 100A and assistant robot 100B may then coordinate movements to be positioned with robotic arm 104 of primary robot 100A and robotic arm 104 of assistant robot 100B located near opposing sides of object 180, as illustrated in FIG. 5C.

Primary robot 100A and/or assistant robot 100B may then be rotationally displaced to hold object 180 between gripping member 128 of primary robot 100A and gripping member 128 of assistant robot 100B, as shown in FIG. 5D. For example, primary robot 100A may be rotationally displaced in rotational direction R10 (see, e.g., FIG. 2) by mobility subsystem 106 of primary robot 100A such that gripping member 128 of primary robot 100A contacts a side surface of object 180. Additionally or alternatively, assistant robot 100B may be rotationally displaced in rotational direction R11 (see, e.g., FIG. 2) by mobility subsystem 106 of assistant robot 100B such that gripping member 128 of assistant robot 100B contacts an opposite side surface of object 180. In some examples, primary robot 100A and/or assistant robot 100B may rotate such that linking extension 108 remains in substantially the same position and/or orientation. Linking extension 108 may act as a leverage point for each of primary robot 100A and assistant robot 100B to apply additional force to object 180 as each of primary robot 100A and assistant robot 100B pull against linking extension 108 in opposite directions.

Accordingly, primary robot 100A and assistant robot 100B may act in a shoulder-like manner to apply an increased gripping force to object 180, enabling object 180 to be securely held between gripping member 128 of primary robot 100A and gripping member 128 of assistant robot 100B. Because mobility subsystems 106 of primary robot 100A and assistant robot 100B are used to respectively rotate primary robot 100A and assistant robot 100B, thereby moving robotic arms 104 of primary robot 100A and assistant robot 100B toward each other, robotic arms 104 may be utilized for gripping and holding object 180 without need for additional joints and/or other lateral movement mechanisms to move the robotic arms toward each other. Thus, the complexity and number of required components for primary robot 100A and assistant robot 100B may be minimized. Additionally, the use of linked primary robot 100A and assistant robot 100B may enable objects having relatively larger dimensions and/or greater weights to be handled in comparison to conventional robots of comparable size. In at least one example, gripping member 128 of primary robot 100A and gripping member 128 of assistant robot 100B, which may each include a resilient material having a relatively high coefficient of friction with surfaces of object 180, may each bend and/or at least partially conform to a corresponding side surface of object 180 as gripping member 128 of primary robot 100A and gripping member 128 of assistant robot 100B are forced against the respective side surfaces of object 180, thereby increasing the gripping force with which object 180 is held. Primary robot 100A and assistant robot 100B may then coordinate movements to lift, relocate, and/or otherwise manipulate object 180.

Figure 6:
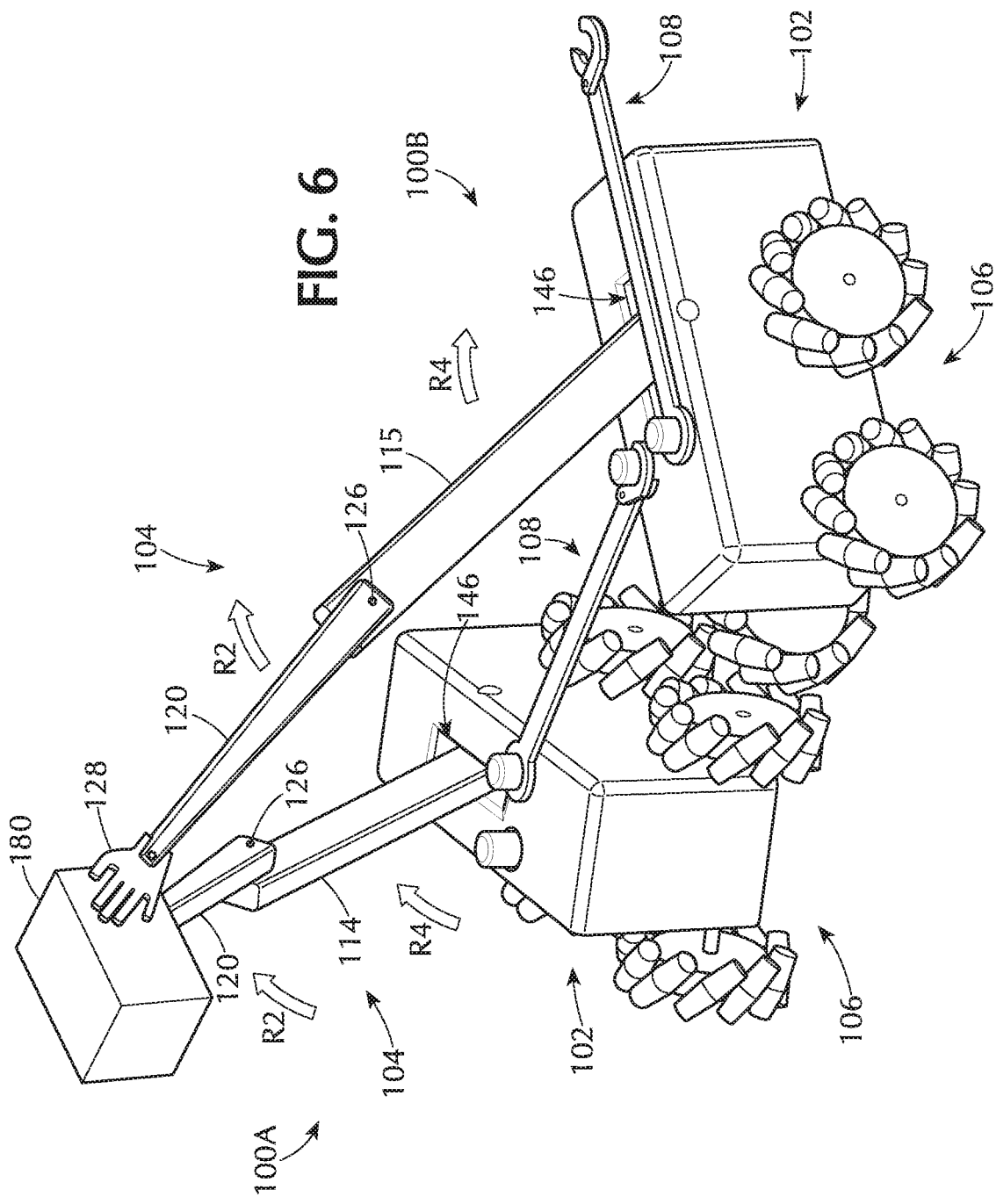
FIG. 6 is a perspective view of an exemplary primary robot and an exemplary assistant robot linked together to hold an object.

FIG. 6 shows object 180 held in a raised position by primary robot 100A and assistant robot 100B. In at least one embodiment, once object 180 is grasped between robotic arm 104 of primary robot 100A and robotic arm 104 of assistant robot 100B, control subsystem 156 of primary robot 100A and control subsystem 156 of assistant robot 100B (see, e.g., FIG. 4A) may coordinate movements of robotic arm 104 of primary robot 100A and robotic arm 104 of assistant robot 100B to raise object 180 from, for example, a floor surface to a raised position shown in FIG. 6 and/or to any other suitable raised position. For example, main arm segment 115 and/or extending arm segment 120 of primary robot 100A may respectively move in rotational direction R4 and R2 (see, e.g., FIG. 1A). Simultaneously, main arm segment 115 and/or extending arm segment 120 of assistant robot 100B may respectively move in rotational direction R4 and R2. Accordingly, robotic arm 104 of primary robot 100A and robotic arm 104 of assistant robot 100B may move in conjunction with each other to raise object 180 as object 180 is continuously held between gripping member 128 of primary robot 100A and gripping member 128 of assistant robot 100B. In at least one example, in order to maintain a secure grip on object 180 as object 180 is raised, primary robot 100A may be further rotationally displaced in rotational direction R10 (see, e.g., FIG. 5D) by mobility subsystem 106 of primary robot 100A and assistant robot 100B may be rotationally displaced in rotational direction R11 by mobility subsystem 106 of assistant robot 100B such that gripping member 128 of primary robot 100A and gripping member 128 of assistant robot 100B maintain close contact with object 180 as object 180 is lifted.

While object 180 is held in the lifted position shown in FIG. 6, primary robot 100A and assistant robot 100B may be displaced by mobility subsystem 106 of primary robot 100A and mobility subsystem 106 of assistant robot 100B in conjunction with each other to hold and move object 180 to a desired location. Subsequently, object 180 may be deposited in a desired location. For example, primary robot 100A and assistant robot 100B may move object 190 to a target shelf, server rack location, floor location, or other suitable surface or location. In some examples, movements of robotic arm 104 of primary robot 100A and robotic arm 104 of assistant robot 100B may be coordinated to lower object 180 to a desired position. Once object 180 is located in a target location and position, control subsystem 156 of primary robot 100A and control subsystem 156 of assistant robot 100B (see, e.g., FIG. 4A) may coordinate movements of primary robot 100A and assistant robot 100B to release object 180. For example, primary robot 100A may be rotationally displaced by mobility subsystem 106 of primary robot 100A and/or assistant robot 100B may be rotationally displaced by mobility subsystem 106 of assistant robot 100B, respectively, in directions opposite to those illustrated in FIG. 5D, thereby releasing object 180 from being held between gripping member 128 of primary robot 100A and gripping member 128 of assistant robot 100B.

While FIGS. 5B-6 illustrate two robots linked together to perform various tasks, such as holding, lifting, and moving objects, any suitable number of robots may be linked together to perform desired tasks. For example, three or more robots 100 may be consecutively linked together in a line or other suitable formation, with adjacent robots 100 being joined together by corresponding linking extensions 108 connected to adjacent coupling protrusions 142 to perform various tasks in conjunction with each other. Additionally, while FIGS. 1A-2 and 5A-6 show robots 100 having mobility systems 106 that include a plurality of omnidirectional wheels that are configured to displace robots 100 along a surface, robots having any suitable mobility system may be utilized in the same or similar manner as robots 100. According to some embodiments, for example, robots may include various aerial mobility systems (e.g., unmanned aerial vehicles), aquatic mobility systems (e.g., autonomous underwater or surface vehicles), and/or spacecraft mobility systems (e.g., unmanned spacecraft or probes) that are capable of omnidirectional movement in air, water, and/or space. Such robots may each include a linking extension (see, e.g., linking extension 108 shown in FIGS. 1A-4A and 5A-6) that links such robots together and a robotic arm (see, e.g., robotic arm 104 shown in FIGS. 1A-4A and 5A-6) that functions as described herein to hold, lift, lower, move, and/or otherwise manipulate various objects.

Figure 7:
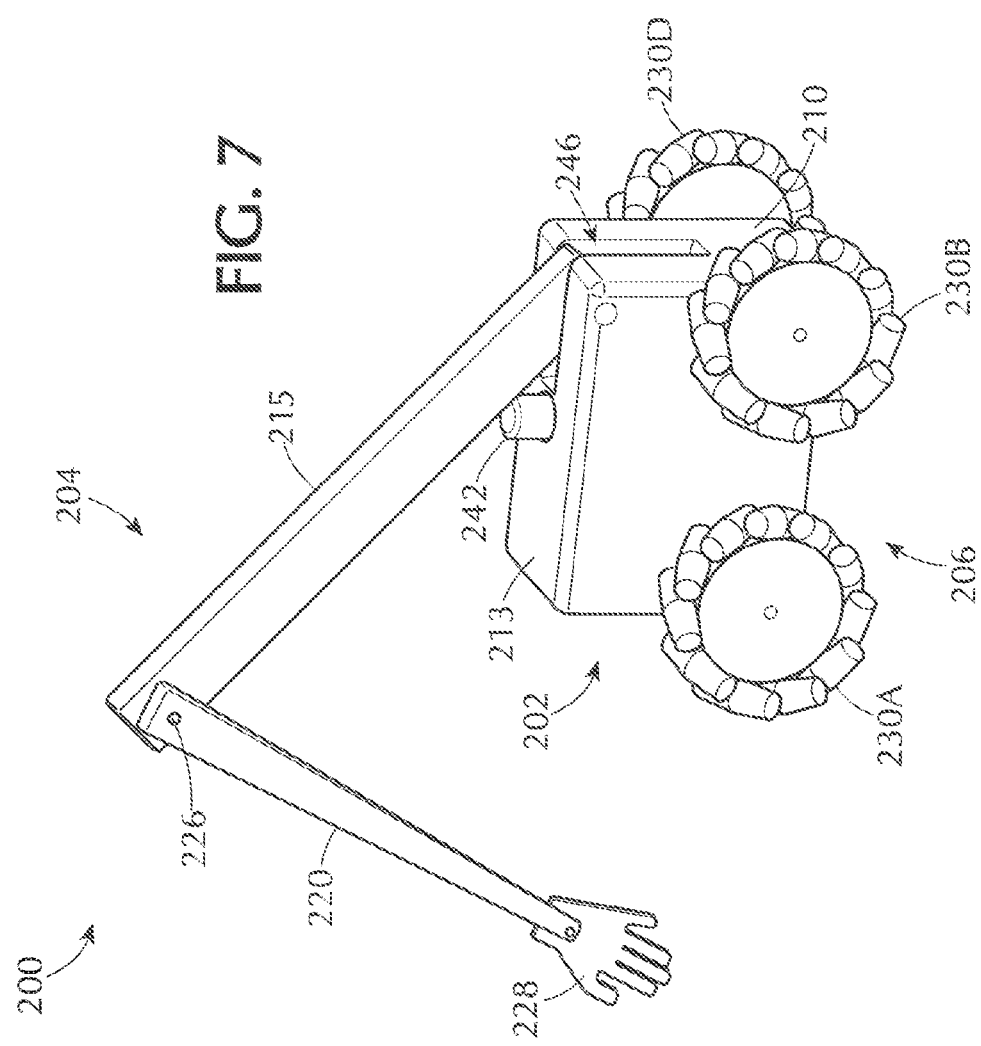
FIG. 7 is a perspective view of an exemplary robot in accordance with some embodiments.

FIG. 7 shows a robot 200 in accordance with some embodiments. As shown in this figure, robot 200 may include a body 202, a robotic arm 204, and a mobility subsystem 206. In some embodiments, robot 200 may additionally include a linking extension (e.g., linking extension 108 shown in FIGS. 1A and 1B). Body 202 of robot 200 may be any suitable shape or size such as, without limitation. For example, body 202 may have a rectangular cuboid shape that that is reduced in size in comparison to body 102 shown in FIGS. 1A and 1B (e.g., body 202 may have a shorter length and/or width with respect to robotic arm 204 as shown in FIG. 7). In some examples, body 202 may include a coupling member 242 that protrudes from an upper surface 213 and that is utilized in joining robot 200 to another robot (e.g., robot 100 shown in FIGS. 1A and 1B).

Robotic arm 204 may be coupled to body 202 such that robotic arm 204 extends from body 202. In at least one embodiment, a proximal end portion of robotic arm 204 may be disposed within a longitudinally extending recess 246 defined by body 202. As shown in FIG. 7, recess 246 may extend to a rearward surface 210 of body 202 such that recess 246 extends along a portion of rearward surface 210. Accordingly, recess 246 may afford robotic arm 204 a a relatively greater degree of movement along recess 246. Robotic arm 204 may include a plurality of sections, including a main arm segment 215 that is coupled to an extending arm segment 220. Extending arm segment 220 may be rotatably coupled to main arm segment 215 by an arm joint 226 such that extending arm segment 220 is rotatable relative to main arm segment 215 (see, e.g., FIG. 1A). In at least one embodiment, a gripping member 228 for contacting and manipulating an object may be coupled to a distal end of extending arm segment 220.

Mobility subsystem 206, which provides omnidirectional displacement of robot 200, may be coupled to at least a portion of body 202. According to at least one example, mobility subsystem 206 may include a holonomic drive system having a plurality of wheels that are attached to body 202 via corresponding axles. For example, a front wheel 230A, rear wheel 230B, and rear wheel 230D are visible in FIG. 7. Mobility subsystem 206 may include an additional front wheel (see, e.g., rear wheel 130B shown in FIG. 2) on a side of body 202 opposite front wheel 230A. Robot 200 may also include various computing device components and subsystems, such as those illustrated, for example, in FIG. 4A. Robot 200 may be utilized in combination with one or more other robots in accordance with the various robots, systems, and methods shown and described herein. In some embodiments, robot 200 may be utilized as an assistant robot in combination with a primary robot (e.g., primary robot 100A shown in FIGS. 4B-6). For example, a primary robot, such as primary robot 100A, may be linked to robot 200 via a linking extension (e.g., linking extension 108) that is rotatably coupled to coupling member 242 of robot 200. Robot 200 may have a smaller size than primary robot 100A such that robot 200 may be produced at a lower cost utilizing fewer materials than primary robot 100A.

Figure 8:
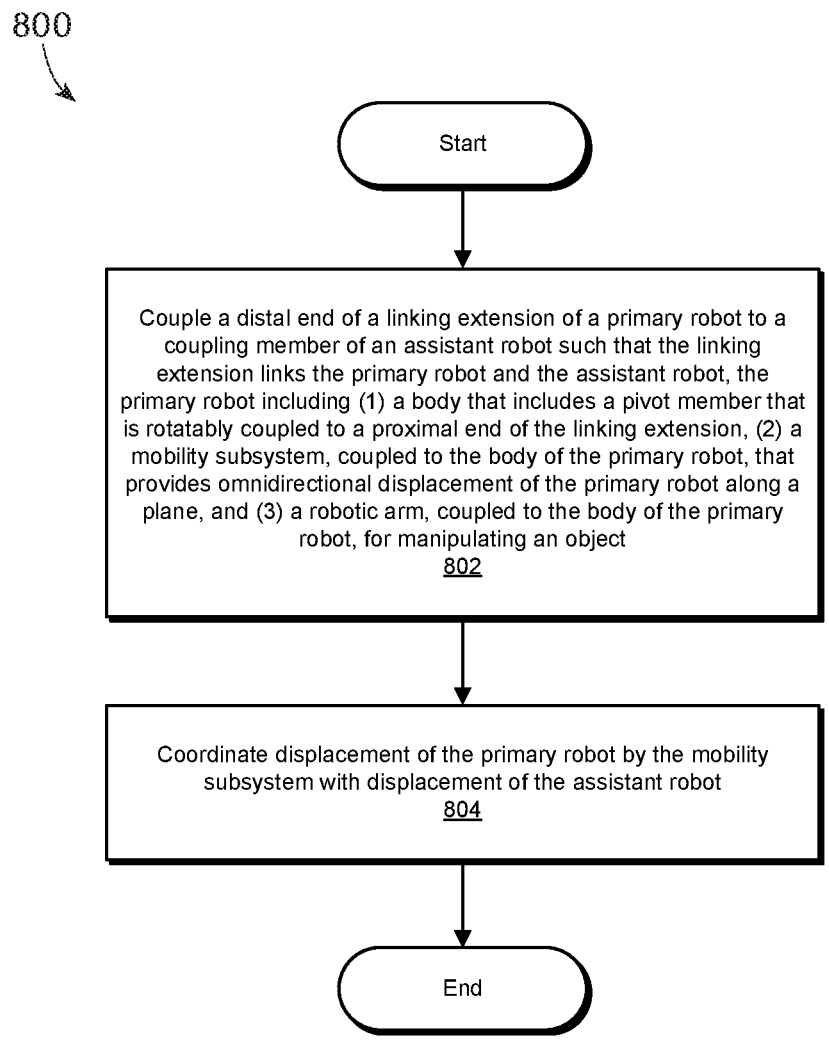
FIG. 8 is a flow diagram of an exemplary method for linking and coordinating movements of multiple robots.

FIG. 8 is a flow diagram of an exemplary method 800 for coordinating movements of a primary robot with movements of an assistant robot to perform various tasks and/or activities. One or more of the steps shown in FIG. 8 may be performed and/or facilitated by any suitable computer-executable code and/or computing system, including system components of robot 100 shown in FIG. 4A, system 170 shown in FIG. 4B, and/or variations or combinations of one or more of the same. In one example, at least a portion of one or more of the steps shown in FIG. 8 may represent an algorithm whose structure includes and/or is represented by multiple sub-steps.

As illustrated in FIG. 8, at step 802, one or more of the systems and/or components described herein may couple a distal end of a linking extension of a primary robot to a coupling member of an assistant robot such that the linking extension links the primary robot and the assistant robot. The primary robot may include (1) a body that includes a pivot member that is rotatably coupled to a proximal end of the linking extension, (2) a mobility subsystem, coupled to the body of the primary robot, that provides omnidirectional displacement of the primary robot along a plane, and (3) a robotic arm, coupled to the body of the primary robot, for manipulating an object.

For example, one or more components (e.g., control subsystem 156, mobility subsystem 106, and/or linking extension subsystem 160) of primary robot 100A may couple distal end 136 of linking extension 108 of primary robot 100A to coupling member 142 of assistant robot 100B such that linking extension 108 links primary robot 100A and assistant robot 100B (see, e.g., FIGS. 1A-6). Primary robot 100A may include (1) body 102 that includes pivot member 140 that is rotatably coupled to proximal end 134 of linking extension 108, (2) mobility subsystem 106, coupled to body 102 of primary robot 100A, that provides omnidirectional displacement of primary robot 100A along a plane (e.g., a plane extending in X and Z dimensions shown in FIGS. 1A and 2), and (3) robotic arm 104, coupled to body 102 of primary robot 100A, for manipulating object 180 (see, e.g., FIGS. 1A-6).

At step 804 in FIG. 8, one or more of the systems and/or components described herein may coordinate displacement of the primary robot by the mobility subsystem with displacement of the assistant robot. For example, one or more components (e.g., control subsystem 156 and/or mobility subsystem 106) of primary robot 100A may coordinate displacement of primary robot 100A by mobility subsystem 106 of primary robot 100A with displacement of assistant robot 100B by mobility subsystem 106 of assistant robot 100B (see, e.g., FIGS. 4A-6).

In some embodiments, one or more of the systems and/or components described herein may coordinate movement of the robotic arm of the primary robot relative to the body of the primary robot with movement of a robotic arm of the assistant robot. For example, one or more components (e.g., control subsystem 156 and/or robotic arm subsystem 158) of primary robot 100A may coordinate movement of robotic arm 104 of primary robot 100A relative to body 102 of primary robot 100A with movement of robotic arm 104 of assistant robot 100B (see, e.g., FIGS. 4A, 4B, 5D, and 6).

In at least one embodiment, one or more of the systems and/or components described herein may control the mobility subsystem of the primary robot to rotate the body of the primary robot relative to the linking extension to move the robotic arm of the primary robot toward a robotic arm of the assistant robot to hold the object between the robotic arm of the primary robot and the robotic arm of the assistant robot. For example, one or more components (e.g., control subsystem 156) of primary robot 100A may control mobility subsystem 106 of primary robot 100A to rotate body 102 of primary robot 100A relative to linking extension 108 to move robotic arm 104 of primary robot 100A toward robotic arm 104 of assistant robot 100B to hold object 180 between robotic arm 104 of primary robot 100A and robotic arm 104 of assistant robot 100B (see, e.g., FIGS. 4A-5D).

As discussed throughout the instant disclosure, the disclosed methods, systems, and devices may provide one or more advantages over conventional robots and robot systems. Movements of two or more linked robots may be coordinated to hold an object between robotic arms of the linked robots and to raise, lower, move and/or otherwise manipulate the object. Movements of the robots may also be coordinated to link or unlink the robots via the linking extension. Accordingly, the robots shown and described herein may be utilized together in teams to grasp and lift various objects, including relatively heavy and/or dimensionally large objects. Linking extensions may be utilized to join multiple robots together in a shoulder-like manner such that each of the robots has a constrained degree of movement enabling the robots to more effectively and securely grasp and handle various objects. Because the robots may be linked together to perform the grasping and lifting actions, the complexity and cost of the robots may be minimized. Additionally, the robots may be readily linked and unlinked autonomously, enabling the robots to work together for a period of time without outside intervention to join, and subsequently separate, the robots as a team. Robots disclosed herein may be utilized in a variety of environments and conditions, including, for example data centers, industrial environments (e.g., factories, plants, etc.), warehouses (e.g., storage warehouses, shipping warehouses, etc.), construction sites, buildings, vehicles, outdoor spaces, and/or any other suitable environment or location, without limitation The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. Additionally, while the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

It will also be understood that, although the terms first, second, primary, etc. are, in some instances, used herein to describe various elements, these elements should not be limited by these terms. These terms are used only to distinguish one element from another. For example, a first segment could be termed a second segment, and, similarly, a second segment could be termed a first segment, without departing from the scope of the various described embodiments. The first segment and the second segment are both segments, but they are not the same segment.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A robot-team system comprising:
 a primary robot comprising:
  a body comprising a pivot member;
  a primary mobility subsystem, coupled to the body of the robot, that provides omnidirectional displacement of the robot along a plane, wherein the mobility subsystem comprises a plurality of omnidirectional wheels and each wheel in the plurality of omnidirectional wheels comprises a plurality of angled rollers dimensioned to contact a surface during use;
  a robotic arm, coupled to the body of the robot, for manipulating an object; and
  a linking extension comprising:
   a proximal end that is rotatably coupled to the pivot member of the body of the robot; and
   a distal end that is dimensioned to rotatably couple to a coupling member of an assistant robot such that the linking extension links the robot and the assistant robot;
 a control subsystem, communicatively coupled to the mobility subsystem, that coordinates displacement of the robot by the mobility subsystem with displacement of the assistant robot; and
 the assistant robot, wherein the assistant robot comprises an assistant mobility subsystem, coupled to the body of the assistant robot, that provides omnidirectional displacement of the assistant robot along the plane.

2. The robot-team system of claim 1, wherein the control subsystem further coordinates movement of the robotic arm of the robot relative to the body of the robot with movement of a robotic arm of the assistant robot.

3. The robot-team system of claim 2, wherein the robotic arm of the robot is movable relative to the body of the robot in a direction that is not parallel to the plane.

4. The robot-team system of claim 2, wherein movement of the robotic arm of the robot relative to the body of the robot is constrained in a direction that is parallel to the plane.

5. The robot-team system of claim 2, wherein:
the mobility subsystem displaces the robot along the surface; and
the robotic arm of the robot is movable toward and away from the surface.

6. The robot-team system of claim 1, wherein the robotic arm of the robot comprises:
a main arm segment coupled to the body of the robot; and
an extending arm segment coupled to the main arm segment such that the extending arm segment is movable relative to the main arm segment.

7. The robot-team system of claim 6, wherein:
the extending arm segment is rotatable relative to the main arm segment about a rotational axis; and
movement of the extending arm segment along the rotational axis relative to the body of the robot is constrained.

8. The robot-team system of claim 1, wherein the linking extension of the robot is rotatable about the pivot member of the body of the robot in a direction parallel to the plane.

9. The robot-team system of claim 1, wherein the linking extension of the robot further comprises a movable locking member that releasably secures the distal end of the linking extension to the coupling member of the assistant robot.

10. The robot-team system of claim 1, further comprising a sensor that detects at least one of the object or the assistant robot.

11. A system comprising:
a primary robot comprising:
a body comprising a pivot member;
a mobility subsystem, coupled to the body of the primary robot, that provides omnidirectional displacement of the primary robot along a plane, wherein the mobility subsystem comprises a plurality of omnidirectional wheels and each wheel in the plurality of omnidirectional wheels comprises a plurality of angled rollers dimensioned to contact a surface during use;
a robotic arm, coupled to the body of the primary robot, for manipulating an object; and
a linking extension comprising:
a proximal end that is rotatably coupled to the pivot member of the body of the primary robot; and
a distal end; and
a control subsystem communicatively coupled to the mobility subsystem of the primary robot; and
an assistant robot comprising:
a body comprising a coupling member;
a mobility subsystem, coupled to the body of the assistant robot, that provides omnidirectional displacement of the assistant robot along the plane;
a robotic arm, coupled to the body of the assistant robot, for manipulating the object; and
a control subsystem communicatively coupled to the mobility subsystem of the assistant robot;

wherein:
the distal end of the linking extension of the primary robot is dimensioned to rotatably couple to the coupling member of the assistant robot such that the linking extension links the primary robot and the assistant robot; and
the control subsystem of the primary robot and the control subsystem of the assistant robot coordinate displacement of the primary robot by the mobility subsystem of the primary robot with displacement of the assistant robot by the mobility subsystem of the assistant robot.

12. The system of claim 11, wherein at least one of the control subsystem of the primary robot or the control subsystem of the assistant robot displaces at least one of the primary robot or the assistant robot to hold the object between the robotic arm of the primary robot and the robotic arm of the assistant robot, when the primary robot is coupled to the assistant robot by the linking extension, by at least one of:
controlling, by the control subsystem of the primary robot, the mobility subsystem of the primary robot to rotate the body of the primary robot relative to the linking extension to move the robotic arm of the primary robot toward the robotic arm of the assistant robot; or
controlling, by the control subsystem of the assistant robot, the mobility subsystem of the assistant robot to rotate the body of the assistant robot relative to the linking extension to move the robotic arm of the assistant robot toward the robotic arm of the primary robot.

13. The system of claim 12, wherein the control subsystem of the primary robot and the control subsystem of the assistant robot further coordinate movement of the robotic arm of the primary robot with movement of the robotic arm of the assistant robot to raise or lower the object held between the robotic arm of the primary robot and the robotic arm of the assistant robot.

14. The system of claim 11, wherein at least one of the control subsystem of the primary robot or the control subsystem of the assistant robot displaces at least one of the primary robot or the assistant robot to couple the distal end of the linking extension to the coupling member of the assistant robot by at least one of:
controlling, by the control subsystem of the primary robot, the mobility subsystem of the primary robot to displace the primary robot relative to the assistant robot; or
controlling, by the control subsystem of the assistant robot, the mobility subsystem of the assistant robot to displace the assistant robot relative to the primary robot.

15. The system of claim 11, further comprising an external computing device that is external to the primary robot and the assistant robot and that is communicatively coupled to at least one of a communication subsystem of the primary robot or a communication subsystem of the assistant robot, wherein the control subsystem of the primary robot and the control subsystem of the assistant robot coordinate the displacement of the primary robot with the displacement of the assistant robot based on data received from the external computing device via at the least one of the communication subsystem of the primary robot or the communication subsystem of the assistant robot.

16. The system of claim 11, wherein:
a communication subsystem of the primary robot is communicatively coupled to a communication subsystem of the assistant robot; and
the control subsystem of the primary robot and the control subsystem of the assistant robot coordinate the displacement of the primary robot with the displacement of the assistant robot based on data exchanged between the communication subsystem of the primary robot and the communication subsystem of the assistant robot.

17. A method comprising:
coupling a distal end of a linking extension of a primary robot to a coupling member of an assistant robot such that the linking extension links the primary robot and the assistant robot, the primary robot comprising:
- a body comprising a pivot member that is rotatably coupled to a proximal end of the linking extension;
- a mobility subsystem, coupled to the body of the primary robot, that provides omnidirectional displacement of the primary robot along a plane, wherein the mobility subsystem comprises a plurality of omnidirectional wheels and each wheel in the plurality of omnidirectional wheels comprises a plurality of angled rollers dimensioned to contact a surface during use; and
- a robotic arm, coupled to the body of the primary robot, for manipulating an object;

coordinating displacement of the primary robot by the mobility subsystem with displacement of the assistant robot; and
controlling the mobility subsystem of the primary robot to rotate the body of the primary robot relative to the linking extension to move the robotic arm of the primary robot toward a robotic arm of the assistant robot to hold the object between the robotic arm of the primary robot and the robotic arm of the assistant robot.

18. The method of claim 17, further comprising coordinating movement of the robotic arm of the primary robot relative to the body of the primary robot with movement of a robotic arm of the assistant robot.

19. The robot-team system of claim 1, wherein the mobility subsystem comprises a plurality of omnidirectional wheels and each wheel in the plurality of omnidirectional wheels comprises a plurality of angled rollers dimensioned to contact the surface during use.

20. The robot-team system of claim 19, wherein the control subsystem coordinates movement of each of the plurality of omnidirectional wheels.

* * * * *